United States Patent
Stasenka et al.

(10) Patent No.: US 11,248,178 B2
(45) Date of Patent: Feb. 15, 2022

(54) OPERATION OF FACILITIES FOR CATALYTIC REFORMING

(71) Applicant: SWISS RR ENGINEERING GROUP AG, Stans (CH)

(72) Inventors: Dzmitry Stasenka, Gomel (BY); Torsten Rubel, Schwerin (DE)

(73) Assignee: SWISS RR ENGINEERING GROUP AG, Stans (CH)

( * ) Notice: Subject to any disclaimer, the term of this patent is extended or adjusted under 35 U.S.C. 154(b) by 0 days.

(21) Appl. No.: 16/624,453

(22) PCT Filed: Jun. 26, 2018

(86) PCT No.: PCT/EP2018/067161
§ 371 (c)(1),
(2) Date: Dec. 19, 2019

(87) PCT Pub. No.: WO2019/002320
PCT Pub. Date: Jan. 3, 2019

(65) Prior Publication Data
US 2020/0181508 A1    Jun. 11, 2020

(30) Foreign Application Priority Data
Jun. 28, 2017  (EP) ..................... 17178519

(51) Int. Cl.
*C10G 35/24*       (2006.01)
*B01J 19/00*       (2006.01)
(Continued)

(52) U.S. Cl.
CPC .......... *C10G 35/24* (2013.01); *B01J 19/0013* (2013.01); *B01J 19/245* (2013.01);
(Continued)

(58) Field of Classification Search
None
See application file for complete search history.

(56) References Cited

U.S. PATENT DOCUMENTS

| | | | |
|---|---|---|---|
| 3,621,217 A | 11/1971 | Carr et al. | |
| 3,974,064 A * | 8/1976 | Bajek | C10G 35/24 |
| | | | 208/134 |

(Continued)

FOREIGN PATENT DOCUMENTS

| | | |
|---|---|---|
| DE | 244 353 | 4/1987 |
| JP | 2000-303076 | 10/2000 |
| JP | 2003-303076 | 10/2000 |

OTHER PUBLICATIONS

Aboalfazl Askari et al., "Simulation and Modeling of Catalytic Reforming Process", Petroleum & Coal, 2012, vol. 54, pp. 76-84; discussed in the specification.
(Continued)

*Primary Examiner* — Tam M Nguyen
(74) *Attorney, Agent, or Firm* — Rankin, Hill & Clark LLP

(57) ABSTRACT

A method for optimising the operation of a facility for catalytic reforming, the facility including a multitude of reactors which have a catalyser and through which an operating gas including hydrocarbons and molecular hydrogen successively flows, wherein the composition of the operating gas in the reactors changes and wherein a product results at the outlet side of the last reactor. Specific constant characteristics as well as initial operating parameters that are present during the operation of the facility are acquired. A computational simulation of the chemical processes in the reactors then takes place, wherein results of a measurement of the chemical composition of the product at the outlet side of the last reactor is also included. A computational simulation of the chemical processes in the reactors with different varied operating parameters is subsequently carried out and set of optimised operating parameters is determined from the computed chemical composition.

10 Claims, 3 Drawing Sheets

(51) Int. Cl.
*B01J 19/24* (2006.01)
*G01N 30/02* (2006.01)

(52) U.S. Cl.
CPC ............ *B01J 2219/0004* (2013.01); *B01J 2219/00063* (2013.01); *B01J 2219/00072* (2013.01); *B01J 2219/00162* (2013.01); *B01J 2219/00243* (2013.01); *C10G 2300/1044* (2013.01); *C10G 2300/305* (2013.01); *C10G 2400/26* (2013.01); *G01N 30/02* (2013.01); *G01N 2030/025* (2013.01)

(56) References Cited

U.S. PATENT DOCUMENTS

| | | | |
|---|---|---|---|
| 4,228,509 A | | 10/1980 | Kennedy |
| 4,816,121 A | * | 3/1989 | Keefer .................. B21D 39/04 204/156 |
| 2015/0073188 A1 | * | 3/2015 | Floudas ................. C10G 45/12 585/332 |
| 2015/0217259 A1 | * | 8/2015 | Baldea .................... C01B 3/384 252/373 |
| 2021/0245139 A1 | * | 8/2021 | Seabaugh ................ B01J 33/00 |

OTHER PUBLICATIONS

Rafiqul Gani et al., "Process Systems Engineering, 2. Modeling and Simulation", Ullmann's Encyclopedia of Industrial Chemistry, Oct. 15, 2012, Wiley-VCH, Weinheim, 54 pages; cited in International Search Report.

"Reforming", Lexicon of Chemistry, 1998 Spektrum Akademischer Verlag, Heidelberg, Germany, 6 pages; discussed in the specification.

English translation of International Preliminary Report on Patentability dated Dec. 31, 2019, Application No. PCT/EP2018/067161, 7 pages.

* cited by examiner

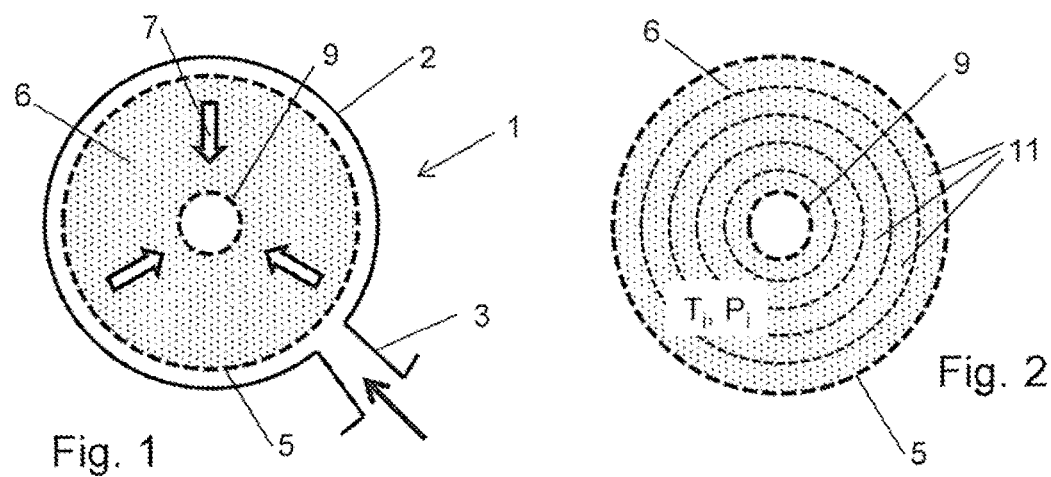
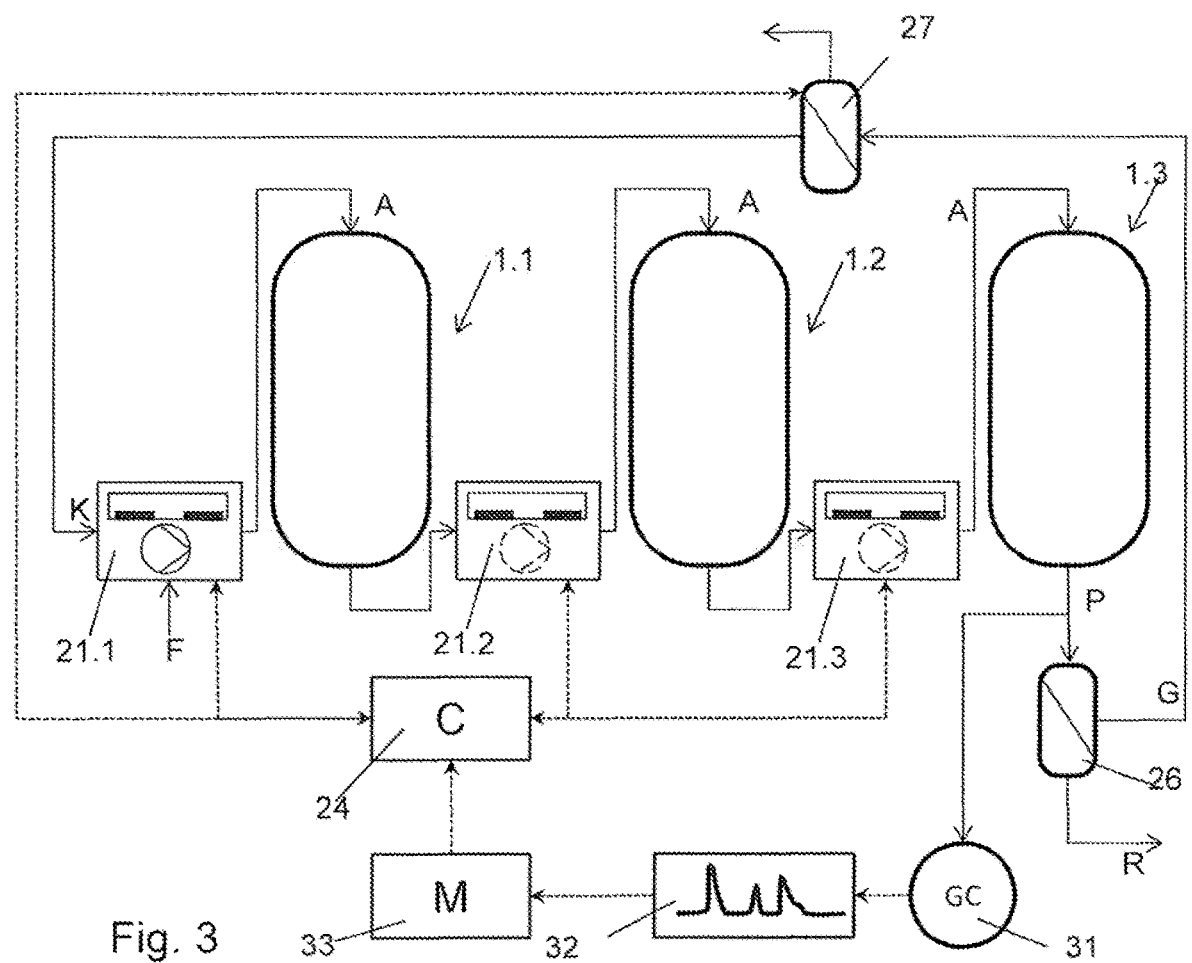

OPERATION OF FACILITIES FOR CATALYTIC REFORMING

BACKGROUND OF THE INVENTION

Field of the Invention

The invention relates to the field of crude oil processing. In particular, it relates to the one part-field of the refining of crude oil, specifically the catalytic reforming for the purpose of increasing the octane number and obtaining molecular hydrogen and short-chained hydrocarbons (generally termed LPG, i.e., liquid petroleum gas) from the raw gasoline that is obtained by crude oil distillation as well, depending on the requirements, for also increasing the share of aromatics.

Description of Related Art

It is particularly the traditional fixed-bed reactors as well as the somewhat more complicated regenerative, so-called CCR reactors, which are known for catalytic reforming. Generally, reactors of both types include a rotation-cylindrical volume, in which the catalyser—with a sand-like consistency—is arranged between an outer gas-permeable wall and an inner gas-permeable wall and through which, generally from the outside to the inside, a gas mixture with the evaporated raw gasoline (naphtha) which is to be reformed as well as with a circulation gas which contains molecular hydrogen flows. This gas mixture changes its composition due to the process. This gas mixture which flows through the reactor or the reactors is hereinafter called the operating gas.

Generally, the operating gas flows successively through several reactor stages before it is fractionated as a reforming product in a post-processing step and the products which arise after the fractionation (hydrogen gas mixture, from which the circulation gas is branched off; reformate, LPG, vapour, exhaust gas, etc.) can be extracted or processed further. In a so-called semi-regenerative facility, the reactor stages are formed by separate fixed-bed reactors, whereas in a regenerative (CCR) facility, the reactor stages are formed by part-reactors, which, under certain circumstances, are arranged above one another and through which the catalyser flows.

The performance of the reactors depends on a series of parameters, amongst these on the operating pressure that is produced by compressors, on the operating temperature (generally plus-minus 500° C.), on the composition and the condition of the catalyser, and on the composition of the operating gas.

It is known to apply regulation (closed-loop control) software in facilities for catalytic reforming. Such software regulates (closed-loop controls) the operating pressure and the operating temperature via the heating elements which are required for the process as well as via the pumps of the facility, on the basis of results of a gas chromatography of the reforming product, the reforming product resulting after the last reactor stage. Such regulation software has the advantage that a rapid reaction to changed conditions in the facility would be possible (which, however in practise is often of little relevance, at least after a start-up procedure). However, such regulation software is only suitable to a limited extent for the optimisation of the process, not least because the demand of reactions in real-time only permits the acquisition and processing of very coarse data.

Likewise known are kinetic reactor models, which permit the very coarse modelling of facilities in a generic manner, i.e., on the basis of generic information concerning the applied components, amid the aid of statistical values.

Optimisation gains of a few percent or even in the tenths of one percent range indeed render a significant effort worthwhile due to the very large throughputs and the very large operating expense of refining facilities. It would therefore be desirable to have approaches as to how the efficiency of existing or newly planned facilities for catalytic reforming can be further improved. Such an improvement in efficiency is therefore the object of the present invention.

SUMMARY OF THE INVENTION

The present invention amongst other things is based on the recognition that a computational determination of operating parameters for an operation in an equilibrium state (with constant operating parameters) of a facility is advantageous for catalytic reforming, particularly if amongst other things, the temperatures of the operating gas at the inlet of each reactor can be individually adjusted as such operating parameters, which can indeed be adjusted.

Accordingly, a method for operating a facility for catalytic reforming is provided, the facility including a multitude of reactors, the reactors including a catalyser and through which reactors an operating gas including a hydrocarbons and molecular hydrogen successively flows, wherein the composition of the operating gas changes in the reactors, and wherein a product results at the outlet side of the last of the reactors.

According to the method and in a first step, specific, constant, fixed characteristics and operating parameters of the facility, which is already brought into operation, are acquired, and a chemical composition of the product or of a part-quantity of the product (for example without molecular hydrogen) is determined by a measurement.

In a second step (first simulation phase), a simulation of the chemical processes in the reactors is carried out, wherein different conditions in the various reactors are taken into consideration, and wherein apart from the geometric characteristics and the operating parameters, the measured chemical composition is also entered into the simulation.

In a third step (second simulation phase), a simulation of the chemical procedures with varied operating parameters is carried out without the necessity of further measurements. The invention according to an aspect is characterised in that herein, apart from the flow rate of circulation gas (for example, of molecular hydrogen as a constituent of the circulation gas), the temperatures of the operating gas at the inlet of each reactors can also be individually adjusted as operating parameters and regulating variables.

The simulation according to the third step is used for the optimisation of the operating parameters, by way of a set of operating parameters (including the individual operating gas temperatures at the inlet of each reactor), which is optimised with regard to a defined objective being determined by way of variation of the operating parameters.

The optimisation of the operating parameters in the third step can be effected in a manner known per se. One possibility lies in a target value firstly being set. Such a target value can be a simple value, for example, the octane number, the total quantity of reformate, the hydrogen gas quantity or the like. However, it can also be more complex and for example consist of a value that results due to a target function A of the characteristic values of the output-side product—in a simple example it can be the weighted averaging of normalised characteristics (octane number, hydrogen gas quantity, share of naphthenes, share of paraffins, etc.). This target value is then maximised by way of the operating parameters being varied, for example firstly in a stepwise manner in a coarse scaling and in the environment of a maximal value yet in a finer scaling, etc. Other maximisation methods known from numerics such as, for example, the selection of random numbers as starting values are also conceivable.

Examples for target functions are:
Maximisation of the output of reformate at a given octane number:
A ($T_i$, G, Q, P)→max;
Maximisation of the octane number, given an unchanged quantity of reformate:
Ok ($T_i$, G, Q, P)→max;
Maximisation of the output of hydrogen ($H_2$), given a predefined restriction of the octane number or the output of reformate:
$H_2$($T_i$, G, Q, P)→max;
The maximisation of the output of one or more hydrocarbons (aromatics) in the reformate, whilst restricting the remaining product parameters.
Ya, $Y_H$, YΠ($T_i$, G, Q, P)→max;

The bandwidths, in which the operating parameters are varied, result from the technologically meaningful limits which are known and documented for reactors:
$T_{min} < T_i < T_{max}$, ($T_{min}$, $T_i$, $T_{max}$—variable temperature ranges for each reactor in its documented limit values). The lower limit value is determined, for example, by the reaction temperature of the catalyser, the upper limit value by its heat resistance. By way of example: $T_{min}$=457° C., $T_{max}$=520° C. $P_{min} < P_1 < P_{max}$, ($P_{min}$, $P_i$, $P_{max}$, —variable pressure ranges for each reactor in its documented limit values)
$n_{min} < n < n_{max}$, ($n_{min}$, $n_i$, $n_{max}$, —variable ratio of circulation gas to raw material in its documented limit values). Example: 1000-1800 H$M^3$/$M^3$
Ok=$Ok_0$, (Ok, $Ok_0$ produced and given octane number)
$G_{min} < G_i < G_{max}$, ($G_{min}$, $G_i$, $G_{max}$—variable volume utilisation of the reactor unit with the input gas mixture (feed) in its documented limit values).
Q—volume consumption of circulation gas at the inlet of the reactor unit
I—value within the variation limits
$T_i$, $P_i$, can herein obtain a separate value for each reactor of the unit.

In a fourth step, the reactor is adjusted such that it is operated with the optimised operating parameters, specifically, amongst other things, with differently targeted operating gas temperatures at the inlet of each reactor.

The constant characteristics of the facility include the facility geometry, the composition of the catalyser, further characteristics of the physical facility components (for example, the type of facility (fixed-bed reactors vs. CCR facility; the presence of one or more than one compressor, flow direction through the reactors, etc.). The constant characteristics are therefore very specific characteristics of the present facility, which is to be simulated and which are determined by way of measurements or by way of the existing facility-specific specifications (for example, plans, catalyser specification, etc.) and not, as in the state of the art, mere generic values, which are valid, for example, for each component of the generic type.

Operating parameters are values that can be at least partly adjusted by the operator of the facility, such as pressure, temperatures, material flow through the reactors, flow rate of circulation gas (specifically: flow rate of molecular hydrogen; the circulation gas can include further constituents apart from this, for example nitrogen, inert gases, etc.)

An optimisation method for a facility of the mentioned type accordingly includes the following method steps:

Acquiring specific constant characteristics and operating parameters of the facility, Simulation of the chemical processes in the reactors in a first phase, wherein different conditions in the various reactors are taken into account, and wherein, apart from the constant characteristics and the predefined operating parameters (for example pressure, temperature, material flow through the reactors), a measured chemical composition of the product which results at the outlet side of the last reactor or of a part-quantity of the product also enters the simulation, In a second phase, simulation of the chemical processes in the reactors with varied operating parameters, wherein apart from the flow rate of circulation gas (for example of molecular hydrogen as a constituent of the circulation gas), the temperatures of the operating gas at the inlet of each reactor are also individually adjusted as operating parameters and wherein a chemical composition of the product is computed as a result of the simulation.

A set of optimised operating parameters is determined from the results of the second phase, in particular by way of the computed chemical compositions being compared with regard to a specific objective on the basis of predefined criteria and those operating parameters that bring the best results with regard to the objective being selected, in a manual or automated manner.

The inventive use of the reactor inlet temperatures as regulating variables independently of one another has been found to be particularly advantageous for the optimisation. It permits an operation that is specifically adapted to the reaction kinetics in the respective reactor whilst taking account of the fact that the composition of the operating gas differs from reactor to reactor.

A further operating parameter is the pressure. In embodiments, inasmuch as the facility is designed accordingly (for example, by way of one compressor being provided per reactor), the pressure is also set individually, different per reactor, as an operating parameter. This possibility particularly results in the case of fixed-bed reactors but also of CCR facilities with a side-by-side arrangement of the reactors.

In particular, the method is carried out offline, i.e., the mentioned data (constant characteristics, operating parameters, measurement results) is collected once, whereupon the further steps are carried out, without a feedback from the facility being necessary for the further steps. Although online regulations (closed-loop controls) give rise to the impression of being able to react more quickly to changes and the possibilities with regard to this being large due to the available computer powers, an offline solution has seen found to be advantageous in the present context.

On the one hand, on account of this procedure, specifically highly-resolved gas-chromatographic analyses can be used without a pre-grouping into coarsely defined substance groups becoming necessary due to the required speeds. In closed-loop control systems according to the state of the art, the results of the gas chromatography must generally be available within approx. 5 minutes, which is why one can only take into account broadly defined substance groups, for example of a mere single-digit number of substance groups. However, it has been found that a consideration of a larger number of substance groups that are present in the operating gas—for example, without a pre-grouping, i.e., whilst taking into account the full measurement accuracy of the gas chromatograph and/or in a substantial number of in particular at least 30 substances and substance groups—not only entails an improvement of the accuracy on describing the processes taking their course, but also permits an optimisation with an effective, measurable improvement of the efficiency of the complete facility.

This does not rule out the measured and fed substances/substance groups being able to be grouped by the model into subgroups which are meaningful for the simulation.

On the other hand, it has been found that an offline solution is better suited for determining an optimal equilibrium state than a closed-loop control with feedback, probably not least due to the sheer magnitude of common facilities and the corresponding inertia.

In embodiments, the aforementioned steps are therefore carried out offline, without carrying out measuring steps which are carried out during the simulation steps and which enter into the computation afresh. Supplementarily or alternatively, as mentioned, the results of a gas-chromatic analysis are taken into account without a pre-grouping. In contrast to the state of the art therefore, one does not directly use the gas chromatography data as a feedback signal for the control of the process (of course, one does not rule out this being effected additionally to the procedure according to the invention), but indirectly, via the described process, concerning which the measured data no longer directly enter into the optimisation (second phase). This procedure, which appears to be less direct, has been found to be advantageous. This is due to the fact that a more accurate consideration also of the reaction kinetics is possible and as a whole a more accurate, more dependable simulation of the equilibrium state results. The adaptable operating parameters can comprise:

- The temperature of the operating gas at the inlet of each reactor (individually selectable, for example slightly increasing from reactor to rector);
- The pressure; possibly different from reactor to reactor should the facility permit this;
- The feed rate (i.e., the crude gasoline quantity per unit of time);
- The $H_2$ gas quantity per unit of time.

The actual simulation steps are characterised in particular in that the reaction kinetics are take into consideration with real data, which is obtained from the facility and whilst taking into account the characteristics of the catalyser, wherein the sojourn duration of the gas molecules on the catalyser surface can also be included. They therefore differ from statistical methods, which are known from the state of the art, in which one attempts to estimate the operating parameters for an existing facility on the basis of experience vales and data of different facilities of a similar type.

The chemical procedures in a reactor for catalytic reforming are known per se, understood and as such are not part of the present invention, just as the important formulae for the respective kinetics. They are therefore not dealt with once again here, but instead "das Lexikon der Chemie", keyword "Reformieren" (1998 Spektrum Akademischer Verlag, (publisher) Heidelberg currently available in the internet under http://www.spektrum.de/lexikon/chemie/reformieren/7875) or very generally the technical literature are referred to instead.

Methods for carrying out computational simulations of catalytic reforming are also already known and as such are not the subject manner of the present invention. One example is shown by the publication by A. Askari et al., Petroleum & Coal 54 (1), 76-84 (2012). The references 2-12 which are cited therein as well as chapter 2.1 are concerned with the basic kinetic models.

In embodiments, for the simulation—in the first and in the second phase—the volume of the respective reactor is subdivided into a plurality of coaxial hollow cylinder volumes. The in total generally at least regional rotation-cylindrical geometry of the reactors as well as the flow conditions is taken into account by way of this, wherein the flow of the operating gas in the reactor in each case is through the catalyser from the outside to the inside or possibly conversely from the inside to the outside.

Concentrations of gas quantities of substances and/or substance groups in the operating gas, for the simulation are assumed as being constant per hollow cylinder volume, but potentially different from hollow cylinder volume to hollow cylinder volume. There can also be a potentially different temperature in each hollow-cylinder volume than in the adjacent hollow-cylinder volumes. The chemical reactions are applied, for example, to at least 30 substance groups, into which the present (and measured) substances are grouped.

In the first simulation phase, it is particularly the model parameters that are adapted, wherein the constant characteristics of the reactors as well as the operating parameters, at which the measurement was made, are included as constants. Model parameters can be purely phenomenological (for example, coefficients, without special physical characteristics, in equations or formulae) or they can have a physical significance (for example, characterise the flow resistance, etc). In embodiments, purely phenomenological as well as physical parameters are present. For example, starting from a set of model parameter start values, which is based on experience values with other facilities, a simulation of the chemical reactions is carried out and the product resulting according to the reaction is then compared with the product, which is effectively characterised by the measurement, for the purpose of adapting the model parameters. Then, starting from the start values, the model parameters are systematically varied, in order to bring the computed result to agree as much as possible with the measured values (readings). As soon as—quantitatively defined in an abort criterion—the characteristics of the product according to the simulation are sufficiently close to the measured characteristics, the first phase is completed and the model parameters, with which this agreement was achieved—are stored. They serve as constants in the second phase of the simulation method, in which the operating parameters are varied.

A measure as to how close the actual and the computed characteristics of the product are to one another can be found without further ado. For example, the concentrations of the substance groups can be represented mathematically as a vector of a multidimensional vector space and a metric, for example a Euclidean metric can be defined in this vector space, when required with a special weighting of the components, wherein more important components or ones which also only occur in small concentrations can be weighted more greatly than others, for the product characteristics.

A computer program can be produced after completion of the first phase, the computer program in its core including the simulation program, which is used for the first phase, but including the model parameters and non-changing constants, wherein the operating parameters are changeable. Such a computer program is a facility-specific program, which, accordingly includes a physical/chemical model that is adapted in a facility-specific manner. Such a computer program can be transferred to the operator of the facility in compressed and/or encrypted form.

In the second phase, simulations are then carried out with varied operating parameters but with constant model parameters, for the purpose of process optimisation. Herein, there is the possibility of an automatic parameter search—i.e., the computer program, which carries out the second phase of the method, systematically varies the operating parameters in a manner controlled by a suitable algorithm—or a manual adaptation of the parameters can be effected by the user, wherein then too, the actual simulation with the operating parameters, which are selected by the user, can of course be effected with technical aids, thus by a computer. The selection of the optimised operating parameters, with which the facility can be then be effectively operated can be effected in an automated manner on the basis of predefined optimisation criteria, for example weightings of the value of achieved optimisations of various values (octane number, Hz-yield, reformate yield, LPG yield, production of aromatics, reduction of the catalyser coking, etc.) or likewise manually by the operator.

The computation methods according to the approach of the present invention are necessarily to be carried out in a computer-assisted manner and require a high computer power. However, since in particular they can be carried out offline, there are only very generous minimal demands on the computation power. A generic, modern powerful computer system, in particular with several processors or processor cores can be used.

The present invention also relates to a computer program for carrying out the method that is described here.

Furthermore, it also relates to a facility-specific computer program, which includes the results of the first phase as fixed parameters that are no longer to be adapted and in which computer program the operating parameters can be set in an automated or manual manner, in order to carry out the second phase of the simulation. In particular, the facility-specific computer program can include the parameters in encrypted form.

The computer program for carrying out the complete optimisation method as well as the facility-specific computer program can be designed according to each aspect and for each embodiment of the invention that is described here, i.e., all embodiments specified in this text and that relate to the method can also be applied to the computer programs.

The invention also relates to an operating method for a facility of the type, which is discussed above, for catalytic reforming, wherein different temperatures of the operating gas can be differently adjusted in a targeted manner at the inlet of each reactor, and specifically in particular on the basis of the result of simulations, in particular according to the optimisation method which is described in this text.

BRIEF DESCRIPTION OF THE DRAWINGS

A few principles and embodiment examples of the present invention are hereinafter described by way of drawings. There are shown in:

FIG. 1 a schematic cross-sectional representation through a reactor;

FIG. 2 schematically and likewise in a cross-sectional representation, the subdivision into coaxial hollow cylinder volumes;

FIG. 3 a simplified schematic diagram of a facility with fixed-bed reactors;

FIG. 1 schematically shows the principle of a reactor 1. A volume, which is at least partly is filled with a catalyser 6, is formed between an outer gas-permeable wall 5 and an inner gas-permeable wall 9, in an outer vessel 2, which has an inlet 3. The operating gas flows through the outer gas-permeable wall 5 into this volume and out of this again through the inner gas-permeable wall 9 (the flow direction is symbolised by the block arrows 7; an operation with the flow in the other direction, from the inside to the outside, is not ruled out). Molecules that are present in the operating gas are absorbed again and again on the surface of the catalyser on the path through the volume and are desorbed again from there. The sojourn duration on the catalyser surface depends on the temperature, and the adsorption rate as well as the flow paths depends on the temperature and pressure, wherein both have an influence on the reaction kinetics. Furthermore, the characteristics—including the current state; the degree of coking etc. —of the catalyser enter into the reaction kinetics.

Figure 4:
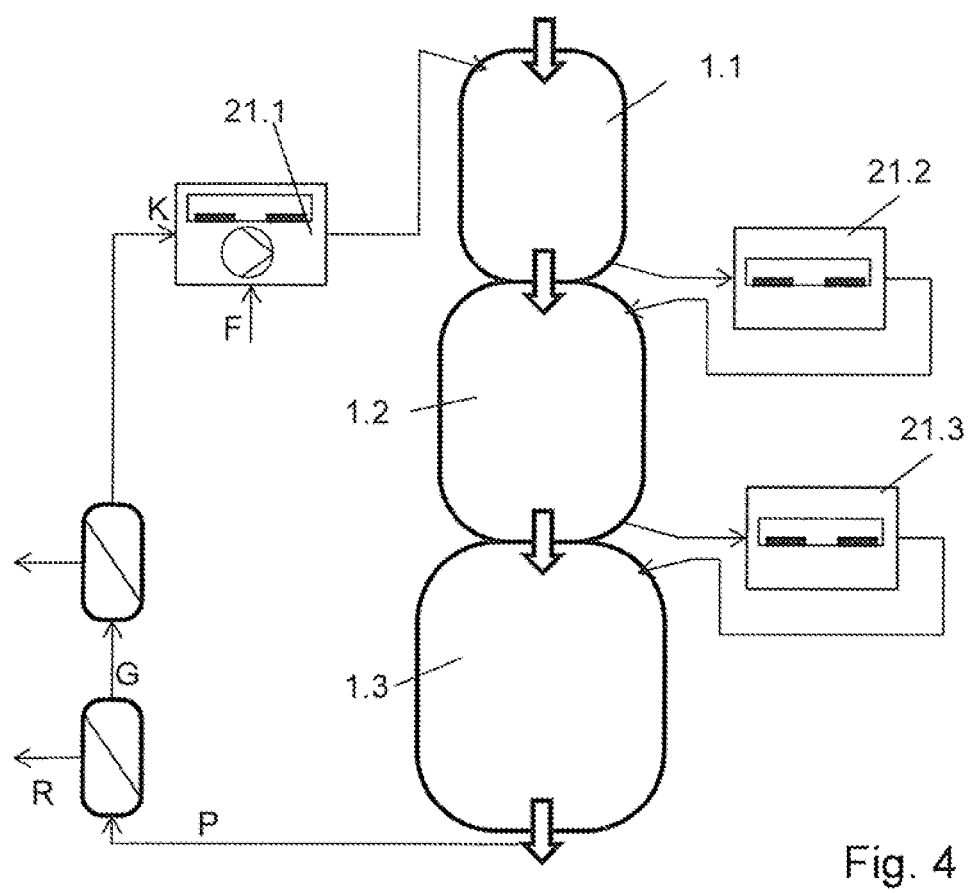
FIG. 4 an even more simplified schematic diagram of a CCR facility.

As mentioned, according to the invention, one now suggests modelling the reaction kinetics, in particular modelling them in an offline manner, on the basis of the chemical reactions, which are known per se, and adjusting the parameters that can be influenced—"operating temperature per reactor", "pressure, in particular per reactor", "flow" and "ratio feed/circulation gas" on the basis of the model.

The chemical reactions during the catalytic reforming can be subdivided into three main groups:
 a) dehydration of naphthenes into aromatics
 b) dehydration and cyclisation of paraffins into naphthenes
 c) hydrocracking naphthenes into short paraffins
 A linear equation system results from this.

The kinetics of these reactions can be modelled on the basis of the law of mass action, in a manner known per se, depending on the pressure and the prevailing temperature and well as on the activity of the catalyser. Herein, the temperature, the concentrations of the individual reaction partners in the operating gas and to a certain extent also the pressure can depend on the position within the reactor. According to an aspect of the invention, one suggests taking this into account by way of the volume, which is filled with the catalyser 6, being divided in the model into ring part-volumes, which is schematically represented in FIG. 2. FIG. 2, as FIG. 1 in a horizontal section, schematically shows the coaxial hollow cylinder volumes 11, which, for example, each have an equally large thickness. Other divisions of the hollow cylinder volume sizes, for example by way of the volumes being selected equally, from which different thickness result, are also not to be ruled out.

The parameters that flow into the modellings—for example the temperature T and the concentrations $C_k$ of the various substances in the operating gas—and possibly also the pressure P can differ from hollow cylinder volume to hollow cylinder volume (index i). In particular, with the shown gas flow direction (FIG. 1), the temperature can drop from the outside to the inside by way of the reactions taking place in the reactors all in all being endothermic.

FIG. 3 shows a facility of the semi-regenerative type (i.e., regeneration of the catalyser is possible in the facility, but only whilst shutting-down the reactor concerned). The facility includes three successively connected reactors 1, specifically fixed-bed reactors 1.1, 1.2, 1.3. A conditioning appliance (which, does not need to be physically configured as a unit and can include, for example, several elements that are separate from one another) 21.1, 21.2. 21.3 is arranged upstream of these in each case. Such a conditioning appliance includes a regulated (closed-loop controlled) operating gas heater as well as a pumping device (generally a compressor; if required a delivery pump can yet also be present for shares that are still liquid). In embodiments of the facility, not every conditioning appliance includes a heater, but for example only one of these. For this reason, the pump symbols of the conditioning appliances 21.2, 21.3 for the second and third reactor are shown in a dashed manner, i.e., represented as being optional, in FIG. 3.

The operating gas A at the inlet side is formed from a feed F, which is already brought into the gaseous condition by way of heating or is still vapourised in the first conditioning appliance 21.1—as well as from the circulation gas K. The operating gas is led successively through the three reactors 1.1, 1.2, 1.3, wherein it changes its composition. The reforming product P, which results after the last reactor 1.3 is fed to a gas separator 26 after its cooling (the respective heat exchanger and cooler can be designed according to the state of the art and are not drawn in FIG. 3). The non-volatile components R (reformate) are subsequently led to further processing steps, which can correspond to the state of the art and are not specified any further here. The resulting volatile components G, which are rich in molecular hydrogen, are fractionated in a fractionator 27 by way of so much gas, as the circulation gas K, being mixed again with the feed at the inlet side, as is necessary for the desired processes. The remainder of the gas G is led away and utilised in accordance with requirements.

A control device 24 controls the conditioning appliances 21.1, 21.2, 21.3, wherein a control loop can be present in each case in a manner known per se, by way of the conditioning appliances having a temperature measurement and/or pressure measurement and/or flow measurement and the control device being configured to set the respective devices of the conditioning appliance and when necessary to readjust them such that a predefined respective value (temperature/pressure/flow etc.) is achieved.

With regard to its construction, the facility as a whole can be constructed analogously to the facilities of the already known type. However, it differs from the state of the art in particular at least with regard to how the control device 24 is configured.

A gas chromatograph 31 is present at the outlet side of the last reactor (connecting directly onto the last reactor or also later, upstream or also downstream of the gas separator 26), and the output 32 of the gas chromatograph flows into the operating data, which is used for the control of the facility in the subsequently described manner. The influence of the measuring data M on the control device 24, the influence according to the procedure described here only being an indirect one, is represented in FIG. 3 by the box 33.

FIG. 4 in an even more schematic manner (without a representation of the control device and the gas chromatograph) shows a variant, in which the facility is designed as a regenerative facility and the reactors 1.1. 1.2. 1.3 are arranged above one another, so that the catalyser, as is illustrated in a very schematic manner by the block arrows, is transported slowly through the reactors during operation on account of the gravity, and the catalyser is regenerated after the removal from the last reactor and regenerated catalyser material is continually fed to the first reactor 1.1 during the operation.

Such a facility differs from the facility of the type which is represented in FIG. 3, in particular also by way of the fact that the operating pressures of the reactors cannot be controlled completely independently of one another on account of the exchange of catalyser material. The second and the third conditioning appliance 21.2, 21.3 in FIG. 4 are therefore drawn without autonomous pumping means.

The facilities, which are represented in a schematic and simplified manner in FIGS. 3 and 4, are merely to be understood as examples. The procedure according to the invention also relates to other facilities, for example facilities with more (or possibly less) than three reactors, regenerative facilities with reactors that are arranged next to one another (and with a transport system for the catalyser, the system being configured for this).

Figure 5:
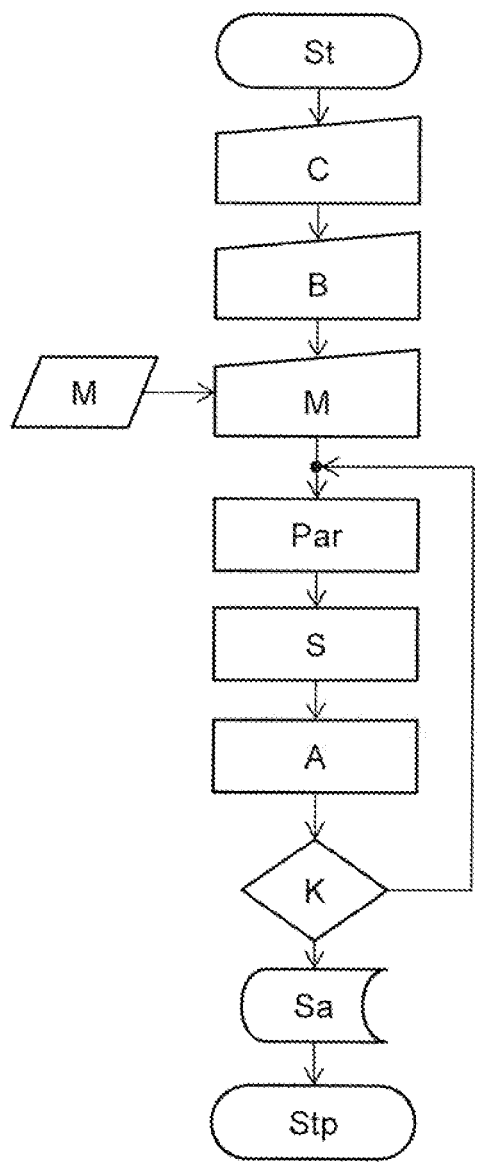
FIG. 5 a simplified flow diagram of the first phase of the simulation process.

FIG. 5 shows a sequence of the first phase of a process optimisation method. "St" indicates the start of the process. In a first step C, the constant real parameters of the facility (geometry of the reactors, filling quantity, etc.) are read in. Then (step B) the operating parameters, as are applied in the facility before the process optimisation, are read in; the process pressure, the process temperature, the circulation gas flow, etc. belong to the operating parameters. The measurement data M is subsequently read in, specifically the data on the composition of the product P or of the reformate R, the data being obtained from the gas chromatograph (see FIG. 3). In contrast to control systems according to the state of the art, herein the complete gas chromatograph is taken into account within the framework of the resolution accuracy of the gas chromatograph, i.e., no pre-grouping of the compounds takes place as is made according to the state of the art, in order to obtain the necessary analysis speed.

In the next step Par, model parameters are selected (step Par). The initial model parameters can, for example, always be selected the same, or they can be coarsely estimated by the operator or software on the basis of the data (constants, operating parameters, measured values). A simulation S with the model parameters is subsequently carried out, and a deviation of the values, which are produced by the model, from the measured values, is quantified (step A). If the deviation does not correspond to an abort criterion (i.e., the deviation is larger than a predefined value; branching location K), the model parameters are adapted (back to step Par), and a simulation takes place afresh. This is carried out until the model parameters produce a adequately small deviation from the real data. As soon as the abort criterion is fulfilled (K), the current, successful model parameters are stored (Sa) and the first phase of the process optimisation method is completed (Stp).

The result of the first phase in particular can be implemented in the form of software into a method, which is tailored to a certain facility, with the stored model parameters. Operating parameters can then be adapted in this software in an automated manner or manually in test series by way of specialised users of the approach according to the invention or by the facility operators.

Figure 6:
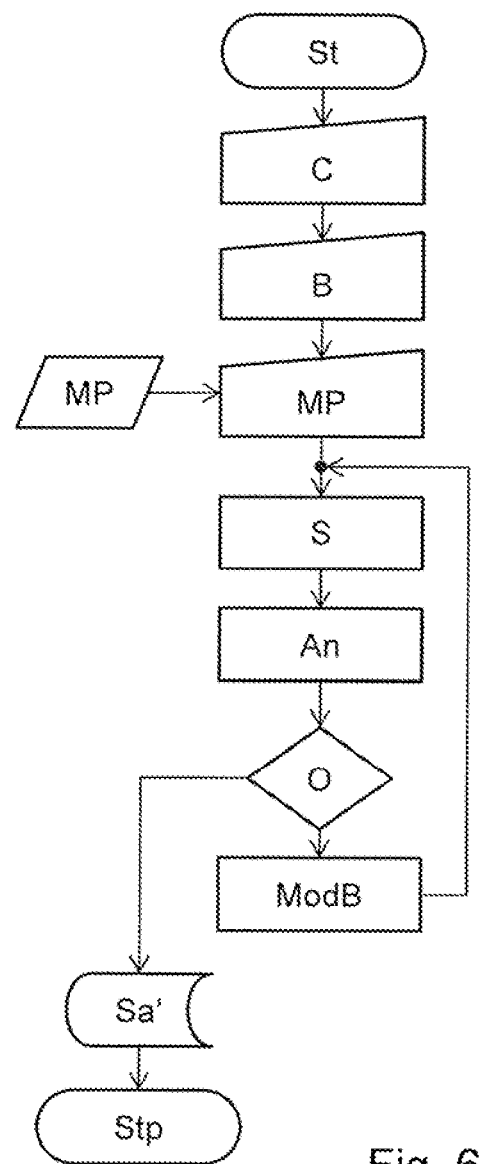
FIG. 6 a simplified flow diagram of the second phase of the simulation process.

FIG. 6 shows the second phase of the process optimisation method. Firstly (steps C, B) the constants and the operating parameters are read in afresh, wherein these can also be adopted by the first phase of the process optimisation method. The model parameters MP, which are determined and stored (step Sa) in the first phase of the process optimisation method, are likewise adopted. A simulation (step S) is then effected, and the results are analysed (step An) with regard to the optimisation, which is to be carried out. Inasmuch as an optimisation potential is still recognised (branching location O), a modification of the operating parameters takes place (ModB), whereupon one simulates afresh. This procedure is repeated by way of systematic variation of the operating parameters until an appreciable optimisation potential no longer exists. Only then are the operating parameters, which are recognised as being optimised, stored (Sa') and outputted, which completes the second phase of the process optimisation method.

Specifications for the optimisation can be
increasing the yield of reformate
increasing the octane number
increasing the yield of molecular hydrogen
increasing the yield of LPG
increasing the production of certain aromatics
increasing the service life of the catalyser (less coking)

The specifications each relate to the comparison with the operation without process optimisation. These specifications are partly at odds with one another, and as to which of the specifications take precedence and with which of the specifications one can accept this hardly being implemented or not at all can be dependent on the specific requirements. However, it has been found that up to a certain degree, all or at least almost all of the specifications can be implemented on account of the optimisation potential for many facilities, and specifically with increased in the single digit percentage range or—given the service life of the catalyser—higher.

Thereupon, in a further step of the process optimisation method, the facility is operated with the adapted operating parameters. A slow, controlled adaption takes place for this purpose. This can be effected in an automated manner or manually by operating personal by way of operating the control device 24.

In principle, there exists the option, after the last step of the process optimisation method, of carrying out the process optimisation method once again beginning with the first phase, in order to once again adapt the model parameters with measurements in the optimised state (in the first phase) and with the adapted model parameters to once again determine as to whether further optimisation potential exists. This, however, is not generally necessary at all since the model is robust with regard to the adaptation of the operating parameters.

EXAMPLE

Exemplary computations for the optimal regime of the process of the catalytic reforming were carried out according to the invention for a facility with three fixed-bed reactors. The subsequent table shows an excerpt of results:

| Q | $Y_a$ % mass aromatics | $Y_H$ % mass naphthenes | $Y_n$ % mass paraffins | $T^1_n$ | $T^2_n$ | $T^3_n$ | G | Ok |
|---|---|---|---|---|---|---|---|---|
| 105 | 0.12 | 0.33 | 0.55 | 469.2 | 493.6 | 530.0 | 105000 | 78.9 |
| 105 | 0.12 | 0.33 | 0.55 | 478.4 | 506.1 | 530.0 | 105000 | 85.0 |
| 80 | 0.12 | 0.33 | 0.55 | 465.7 | 488.3 | 530.0 | 80000 | 85.0 |
| 90 | 0.12 | 0.33 | 0.55 | 469.9 | 493.1 | 530.0 | 90000 | 85.0 |
| 100 | 0.12 | 0.33 | 0.55 | 474.7 | 499.0 | 530.0 | 100000 | 85.0 |
| 120 | 0.12 | 0.33 | 0.55 | 486.4 | 512.8 | 529.6 | 120000 | 85.0 |
| 105 | 0.22 | 0.33 | 0.45 | 472.6 | 500.2 | 530.0 | 105000 | 85.0 |
| 105 | 0.12 | 0.43 | 0.45 | 475.1 | 504.7 | 529.8 | 105000 | 85.0 |

In this table, Q (in $10^3$ m³/h) specifies the volume consumption of circulation gas, $T^i$ the temperature at the inlet of the respective reactor, G the feed (in m³/h) corresponding to Q, and Ok the octane number.

By way of an optimisation, the yield of reformate could be increased by 3-5% in comparison to a basic regime, and a yield of 83.1-85.6% was reached by way of the optimisation on the basis of a yield of 78-82% (basic regime).

The indicated model for the multi-parameter optimisation of the catalytic reforming has the following advantages in comparison with other process optimisations:

Increase of the effectiveness of the applied catalyser by way of using technologically compromised regions of the reaction zone, which hitherto did not fully participate in the reactions.

Increase of the production output by 3-5% (up to 8% possible) as well as the improvement of its quality by way of ensuring a uniform hydrodynamic resistance through the complete catalyser region with a simultaneous increase of the ratio of the active catalyser region to the mass of the paragas mixture that flows through it.

Influencing the kinetics of the thermochemical reactions within the paragas mixture during the contact with the catalyser by way of determining and selecting optimal operating parameters of the reformer unit in the selected annular volumes.

The invention claimed is:

1. A method for optimising an operation of a facility for catalytic reforming, said facility comprising a multitude of reactors, said reactors comprising a catalyser and through which reactors an operating gas comprising hydrocarbons and molecular hydrogen successively flows, wherein a composition of the operating gas changes in the reactors and wherein a product results at an outlet side of the last reactor of the multitude of reactors, said method comprising the following steps:

acquiring specific constant characteristics and initial operating parameters of the facility which are present during the operation, computationally simulating chemical processes in the reactors in a first phase, wherein said first phase includes taking into account different conditions in the various reactors, wherein in said first phase apart from the constant characteristics and the acquired initial operating parameters, results of a measurement of the chemical composition of the product which results at the outlet side of the last reactor or of a part-quantity of said product are used as input values for the simulation, and wherein the first phase yields a first phase simulation result being characteristic of properties of the facility;

computationally simulating the chemical processes in the reactors with different, varied operating parameters in a second phase which is subsequent to the first phase, wherein the first phase simulation result is used for the second phase, wherein in the second phase apart from a flow rate of molecular hydrogen, different temperatures of the operating gas at an inlet of each reactor are individually adjusted as varied operating parameters and wherein a computed chemical composition of the product, which is dependent on the varied operating parameters, is computed as a result of the computational simulation in the second phase, and determining a set of optimised operating parameters from results of the second phase by varying the operating parameters in the second phase.

2. The method according to claim 1, wherein in the second phase, an operating pressure in a reactor is also varied as an operating parameter.

3. The method according to claim 2, wherein as varied operating parameters, different pressures in each reactor are also individually adjusted in the second phase.

4. The method according to claim 1, wherein the computational simulations in the first and in the second phase are carried out offline.

5. The method according to claim 1, wherein the measurement of the chemical composition comprises a gas-chromatographic analysis.

6. The method according to claim 5, wherein for the first phase, the results of the gas-chromatographic analysis are acquired without a pre-grouping.

7. The method according to claim 1, wherein the constant characteristics of the reactors as well as the operating parameters are kept constant for the simulation in the first phase, as a result a computed chemical composition of the product is determined depending on the model parameters and compared to the results of the measurement, and the simulation is repeated with systematically varied model parameters until a deviation of the computed chemical composition of the product from the results of the measurement corresponds to an abort criterion, whereupon the model parameters, with which the abort criterion was reached, are stored as model parameters, which are constant in the second phase.

8. The method according to claim 1, wherein a computer program is produced after completion of the first phase, said computer program comprising a simulation program for the simulation in the second phase as well as model parameters as constants that are determined in the first phase.

9. The method according to claim 1, wherein the operating parameters are systematically varied in the second phase, in order to optimise the product according to predefined optimisation criteria.

10. The method according to claim 1, wherein volumes of the reactors are subdivided into coaxial hollow cylinder volumes for the first simulation as well as for the second simulation, and that for the simulation, concentrations of gas quantities of substances and/or substance groups in the operating gas per hollow cylinder volume are assumed as being constant but potentially different from hollow cylinder volume to hollow cylinder volume.

* * * * *